United States Patent
Muhlberger et al.

[19]

[11] Patent Number: 5,889,348
[45] Date of Patent: Mar. 30, 1999

[54] ROTOR FOR AN ELECTRIC MACHINE, PARTICULARLY A TRANSVERSE FLOW MACHINE

[75] Inventors: Uwe Muhlberger, Heidenheim; Robert Muller, Dillingen; Andreas Lange; Wolfram Angerer, both of Heidenheim, all of Germany

[73] Assignee: Voith Turbo GmbH & Co. KG, Heidenheim, Germany

[21] Appl. No.: 820,117

[22] Filed: Mar. 19, 1997

[30] Foreign Application Priority Data

Mar. 19, 1996 [DE] Germany .................. 196 10 754.7

[51] Int. Cl.⁶ .................. H02K 21/00; H02K 1/02; H02K 1/24

[52] U.S. Cl. .................. 310/218; 310/66; 310/67 R; 310/91; 310/156

[58] Field of Search .................. 310/162, 163, 310/156, 261, 91, 67 R, 66, 218

[56] References Cited

U.S. PATENT DOCUMENTS

| | | | |
|---|---|---|---|
| 4,973,868 | 11/1990 | Wust | 310/51 |
| 5,051,641 | 9/1991 | Weh | 310/163 |
| 5,185,542 | 2/1993 | Lazorchak | 310/36 |
| 5,463,262 | 10/1995 | Uchida | 310/156 |
| 5,712,521 | 1/1998 | Detela | 310/162 |

FOREIGN PATENT DOCUMENTS

| | | | |
|---|---|---|---|
| 0 642 204 A1 | 3/1995 | European Pat. Off. | H02K 1/27 |
| 2 594 272 | 8/1987 | France | H02K 21/08 |
| 35 36 538 A1 | 4/1987 | Germany | H02K 1/06 |
| 3705 089 C2 | 8/1988 | Germany | H02K 21/00 |
| 39 04 516 C1 | 6/1990 | Germany | H02K 21/12 |
| G 91 16 192.4 | 5/1992 | Germany | H02K 21/00 |
| G 92 00 116.5 | 5/1992 | Germany | H02K 21/00 |
| 44 00 614 A1 | 6/1994 | Germany | H02K 21/00 |
| 44 00 614 C2 | 6/1994 | Germany | H02K 1/02 |
| 43 30 272 C1 | 12/1994 | Germany | H02K 1/28 |
| 2 075 247 A2 | 11/1981 | United Kingdom | H02K 1/24 |

*Primary Examiner*—Nestor Ramirez
*Assistant Examiner*—Tran N. Nguyen
*Attorney, Agent, or Firm*—Randall J. Knuth

[57] ABSTRACT

The invention relates to a rotor for an electric machine, specifically a transverse flow machine, comprising at least one support disk and at least one annular pole structure arranged on an end face of the support disk, coaxial to the rotor axis, and extending in axial direction. The pole structure comprises two adjacent rows, separated by an intermediate layer of magnetically and electrically nonconducting material (spacer ring), of the peripheral direction alternately magnetized magnet arrays with interposed collector or soft-iron elements. An end ring is coordinated with each pole structure. A plurality of magnet arrays features an inner and an outer magnet. The design of the collector or soft-iron elements adjoining a magnet array in the peripheral direction is such that they form in radial direction an inner stop and an outer stop for the magnet array.

The invention is characterized in that an intermediate element is coordinated with a plurality of magnet arrays. The intermediate element is in a radial direction arranged between the inner and the outer magnet and extends beyond their axial length. The intermediate element is suited for insertion in mating grooves in the rings end ring, spacer ring and central support disk—adjoining the separate rows, of in peripheral direction having alternately magnetized magnet arrays with interposed collector or soft-iron elements.

10 Claims, 1 Drawing Sheet

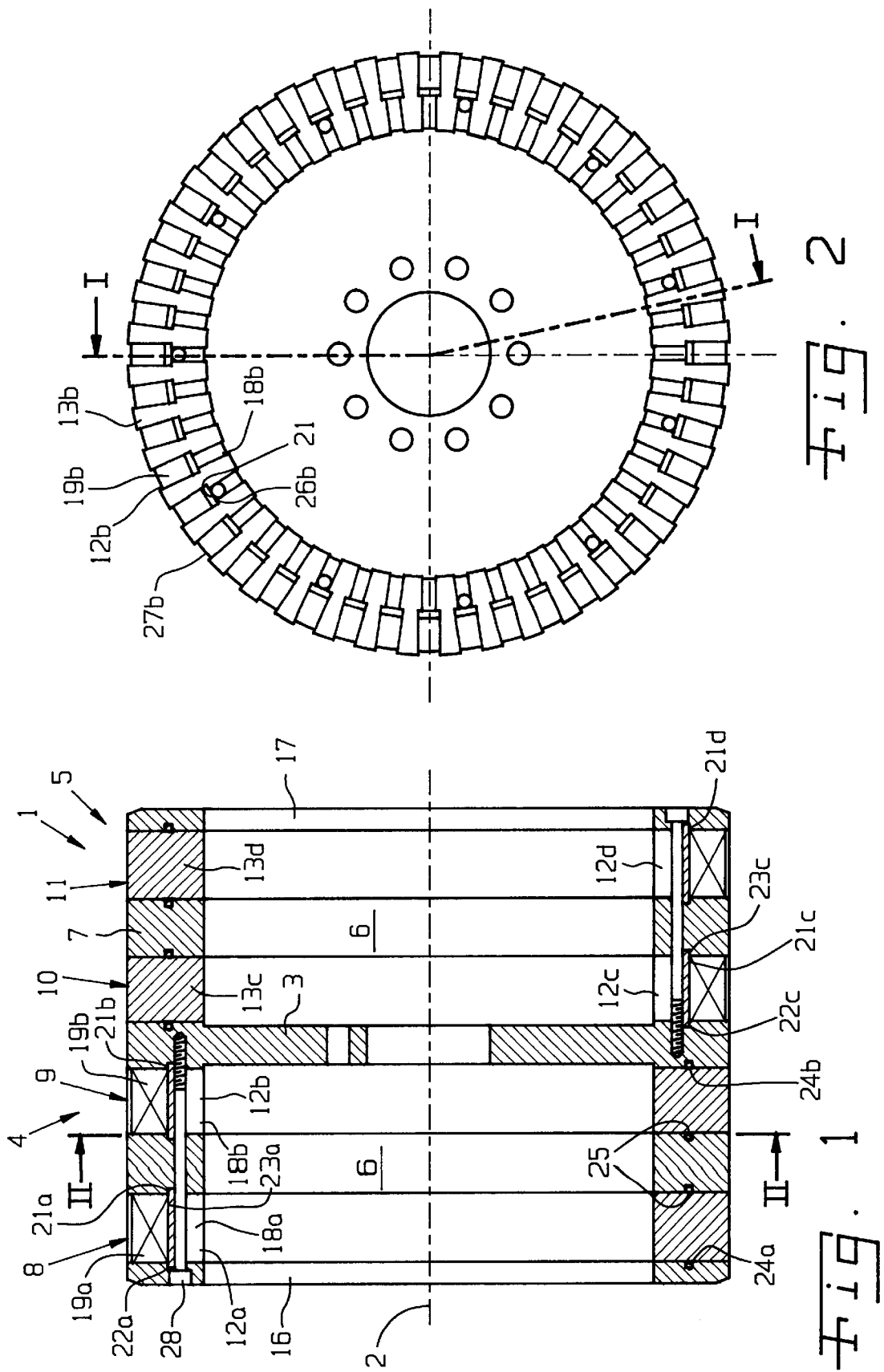

ROTOR FOR AN ELECTRIC MACHINE, PARTICULARLY A TRANSVERSE FLOW MACHINE

BACKGROUND OF THE INVENTION

1. Field of the Invention

The invention relates to a rotor for an electric machine, and more particularly a transverse flow machine.

2. Description of the Related Art

Electric machines operating by the transverse flow principle are previously known from the following patent documents and patent disclosures:

1. DE 35 36 538 A1
2. DE 37 05 089 C1
3. DE 39 04 516 C1.

The basic principle and basic structure of machines operating according to the transverse flow principle are described in detail in these publications. Such electric machines can be operated both as a motor and as that of a generator.

In the described embodiments, the rotor comprises one or several axially stacked concentric rings (active rings) separated from one another by interposed rings of plastic or other electrically nonconducting material and/or a rotor disk, along the periphery of which rings so-called collectors or soft-iron elements, which typically may be constructed of axially stacked laminations, and magnets arranged alternately. These concentric rings are called pole structures.

The stability of the rotor structure, as is generally known, is obtained by gluing, and this joint is additionally secured using plain structural elements, such as bolts, screws, rivets etc. Such designs are known, e.g., from the following documents:

4. DE 91 16 192 U1
5. DE 92 00 116 U1
6. EP 0 642 204 A1
7. DE 44 00 614 C2.

The magnets and collector or soft-iron elements, on the rotor taught in the document DE 91 16 192 U1, are joined together in a support structure of electrically and magnetically nonconducting material. The soft-iron elements are cast or glued together with the permanent magnets; the individual rings (support disk and pole structure) are joined together by gluing. To obtain stability, the pole structures are in a design, according to this document, equipped on both sides of the central support disk with prefabricated receiving rings that feature radially extending pocket type recesses, in which the permanent magnets are centered by themselves and are radially secured and embedded by means of a casting compound or glued. The magnets feature for that purpose, on the two radially opposed boundary faces, different axial dimensions created by an intervening shoulder, the axial dimension of the magnet in the installed position being on the outer boundary face in a radial direction smaller than the boundary face disposed inside, in radial direction. The permanent magnets are in this way precisely fitted sideways and radially, which is meant to permit them to run true with a very fine gap. Providing these receiving rings, however, increases the number of components and thus the manufacturing and assembly costs. The receiving ring and adjacent components in the axial direction—for example support disk, spacer and end ring—are axially joined by gluing. The receiving rings themselves feature on their end face away from the insertion side of the magnets, a shoulder and respectively a step, that brings about a fixing of the receiving rings in radial direction, in conjunction with fasteners of complementary design, that is, in the working direction of the centrifugal forces. With varying constraints, however, the properties of the adhesives and casting compounds are very different. Generally, the strength of the adhesive diminishes with temperature and humidity fluctuations, as well as sustained loading, and simultaneously the stability of the stator. Therefore, the number of separating spots is possibly very high.

The rotor design known from the German utility model DE 92 00 116 U1 comprises collector or soft-iron elements which in the axial direction are provided with U-shaped recesses to receive the magnets. The permanent magnets and collector elements are in a peripheral direction joined by an electrically nonconducting insulation layer, for example glue. While such design includes positional fixing of the permanent magnets in a peripheral direction, such as a fixing in the radial direction, however, is given only by the electrically nonconducting insulation layer. In this design, too, the disadvantages associated with the style relative to the German utility model DE 91 16 192 U1 apply as well.

To realize small rotors where a narrow pole pitch is desired, EP 0 642 204 A1 discloses a design in which the rotor features, in the axial direction, a rotor disk attached to the rotor shaft and fastened in a concentric annular arrangement to it, the polarized magnets and magnetizable collector or soft-iron elements. The joint therebetween being established by means of fasteners that traverse the polarized magnets and attach to the rotor disk, respectively to an insulating ring which, in axial direction, is joined to the rotor disk.

A shortcoming of using these fasteners, while counteracting separating stress, is constituted primarily by the appreciable increase in rotor mass and rotor volume, and thus loss-prone active volume. The bores for threaded insert and bolt through holes provided for assembly of the fasteners require a high manufacturing and machining expense. With fasteners traversing the active rings, either the magnets must be split, i.e., provided in twice the number or, with such components traversing in the region of the collector or soft-iron elements, the latter are subject to high machining and assembly expense. In the case of a rotor designed as described in EP 0 642 204 A1, the centrifugal forces occurring at high speeds of rotation cannot be managed economically by frictional and composition-of-matter joining—notably screwing and gluing.

Known from the embodiment disclosed in DE 44 90 614 C2 is a rotor which, in addition to the support disk, comprises at least one pole structure that consists of two adjacent rows, separated by an intermediate layer of magnetically or electrically nonconducting material, of in peripheral direction, alternately magnetizable magnets with interposed collector or soft-iron elements. The magnets arranged in a pole structure in the rings of collector or soft-iron elements and magnets feature, in the installed position, at least one centering aid each on their axial boundary surfaces. Coordinated with these centering aids, on the end faces of end ring, ia a spacer ring and/or support disk facing the magnets, within mating receiving recesses. Additionally, to reduce the separation sensitivity of the adhesive, deformation zones are provided on the adjacent elements consisting of materials resistant to separation. Providing these centering elements offers the advantage of a radial form-fit between the magnets and adjacent components under the effect of centrifugal force. The position of the magnets is accurately fixed on account of the recesses, and thus at the same time the position of the collector or soft-iron elements disposed between the magnets. Providing deformation zones offers the advantage that a separation between magnets and adjacent elements is normally avoided. While such design is distinguished by a lower component expense as compared to the embodiments disclosed in the aforementioned documents, the manufacturing and assembly expense is considerably higher.

Therefore, the objective underlying the invention is to improve a rotor of the initially named type to the effect that the above disadvantages are avoided and the mechanical stability is increased without impairment of the electromagnetic properties. Along with it, the design is meant to be low-cost as it is distinguished by low manufacturing and assembly expense.

SUMMARY OF THE INVENTION

The rotor comprises at least one support disk and at least one annular pole structure arranged on the support disk end face, coaxially to the rotor axis, and extending in a radial direction. The pole structure comprises two adjacent rows, separated by an intermediate layer (spacer ring) of electrically nonconducting material, of magnet arrays magnetizable alternately in the peripheral direction, with interposed collector or soft-iron elements. Coordinated with each pole structure is an end ring.

The design of the collector or soft-iron elements adjoining a magnet array in the peripheral direction is such that these form, in radial direction, a first inner stop and a second outer stop for the magnet array. A form-fit between individual magnets and collector or soft-iron elements is inventionally established in radial direction in that elements protruding on both sides in the axial direction have a specific spacing in the peripheral direction and are coordinated with the rows of peripherally alternately magnetizable magnet arrays with interposed collector or soft-iron elements, with at least part of the protruding regions being received by complementary grooves in the elements adjoining these rows.

The protruding elements are preferably provided in the region of the magnet arrays. Provided between the rings or elements adjoining in the axial direction of a row of in peripheral direction alternately magnetized magnet arrays with interposed collector or soft-iron elements, notably between the central support disk and the spacer ring, respectively between the spacer ring and the end ring, is for that purpose at least one intermediate element possessing nonmagnetic properties, which element is suited for insertion in mating grooves contained in the elements adjoining the row of in peripheral direction alternately magnetized magnet arrays with interposed collector or soft-iron elements. On the rings consisting of magnet arrays and collector or soft-iron elements, the magnet arrays disposed in peripheral direction between two collector or soft-iron elements are to that end of a two-part design, respectively comprise an inner and an outer magnet. Form-fit is realized by means of the intermediate elements fitted between the inner and outer magnets in the rings consisting of magnet arrays and collector or soft-iron elements and extending in axial direction across the expanse of magnet arrays and with which there are coordinated mating grooves in the elements of the pole structure that consist of nonconducting material, that is, in the central support disk, the spacer ring respectively the end ring.

The design according to the invention allows by means, of an accessory element in the rows of in peripheral direction alternately fitted magnet arrays and collector or soft-iron elements, a sufficient fixing of the individual pole structure elements relative to one another in radial direction, by superimposing the form-fit between a magnet array and the collector or soft-iron elements adjoining these in peripheral direction and the form-fit between the elements adjoining in axial direction the rows of magnet arrays and collector or soft-iron elements. This superimposition makes it possible to create, with plain engineering means, a pole structure that is stable in radial direction.

Viewed in peripheral direction, an intermediate element is preferably coordinated with each magnet array.

The intermediate element is made of nonmagnetic material and has, for example, the shape of a plate. The protruding element, notably the intermediate element, extends in peripheral direction at least across part of the expanse of the magnet array, but preferably across the entire expanse of inner and outer magnets.

But it is also conceivable to give the intermediate element a cylindrical design. It is then fitted in mating bores. At least one such intermediate element can then be arranged in the region of a magnet array.

In addition, screw joints may be provided, evenly distributed across a specific diameter and preferably within the diameter on which the fasteners are arranged, which screw joints realize a clamping in axial direction between the individual pole structure elements, notably the end ring, spacer ring, and central support disk and, arranged in between, and the rings with alternately fitted magnets and collector or soft-iron elements.

Form-fit is realized merely by inserting the form-fit fasteners in mating grooves. Since these elements are preferably plastic components made by specific molding techniques, these grooves are very easy to make and require little additional machining expense. Neither are any stringent requirements involved in terms of manufacturing accuracy, since even with inaccurate fit, that it, with relative movement between the intermediate elements and the mating grooves, a transmission of force is possible due to the effect of centrifugal force. Owing to the participation of the intermediate elements in the transmission of force, considerably fewer screw joints are required as compared to the categorial prior art.

DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a sectional view of a rotor of the present invention;

FIG. 2 is a sectional view of the present invention taken along the line I—I of FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

FIG. 1 shows a section of an axial section through a rotor 1. Rotor 1 comprises a rotor shaft 2, not illustrated here in detail but showing only the rotor axis, and is mounted in a stator housing (not illustrated). Rotor 1 has arranged on it a rotationally fixed, essentially radially extending circular central support disk 3, on each of the end faces of which an annular pole structure 4, respectively 5, coaxial with the rotor axis 2, is fitted. Each pole structure 4, 5 comprises two adjacent rows 8, 9 or 10, 11 of in peripheral direction alternately magnetized permanent magnet arrays 12, here 12a for row 8, 12b for row 9, and—not illustrated—12c and 12d for rows 10, 11, and interposed, but only sectionally illustrated, collector or soft-iron elements 13, said rows being separated by an intermediate layer 6, 7 of magnetically and electrically nonconducting material. Shown here as substitutes are the collector or soft-iron elements 13c for row 10 and 13d for row 11. On its end face, each pole structure 4, 5 has coordinated with it an end ring 16, 17, respectively. Each magnet array comprises substantially two magnets—an inner magnet 18 and an outer magnet 19, for which are shown here 18a, 19a and 18b, 19b, respectively.

Inner magnet 18 is disposed in radial direction on a smaller diameter, based on rotor axis 2, than is outer magnet 19 of each magnet array 12. The magnets are fixed in peripheral direction primarily by form-fit with the collector or soft-iron elements 13 adjoining the magnets in peripheral direction. This is illustrated in FIG. 2. FIG. 2 shows a section I—I relative to FIG. 1, in the form of a view of ring 9 in axial direction.

According to the invention, a form-fit fastener 21 is coordinated with each magnet array 12. Said fastener 21 is Form-fit fastener 21 is formed by an intermediate element in each magnet array 12 disposed between inner and outer magnets 18 and 19, respectively. Form-fit fastener 21 is preferably fashioned as a plate blanked from nonmagnetic sheet metal. It extends in axial direction preferably across the axial expanse of the magnet array 12. Coordinated with the overhangs 22, 23 thus formed are substantially complementary grooves 24a, 25, and 26b in the elements adjoining the rings 8, 9 and 10, 11, respectively. In peripheral direction, the form-fit fasteners 21 extend each substantially across the peripheral expanse of the permanent magnets; a smaller expanse is conceivable as well. The fasteners of each magnet array are inserted between the inner and outer magnet 18 and 19, respectively, in mating grooves 24 (a or b) and 25 contained in the adjacent elements, for example for the magnet array 12a between the groove 24a in the end ring 16 and the groove 25 in the spacer ring 6. The form-fit is realized by inserting the form-fit fastener 21 in grooves 24, 25 on the axial surfaces of spacer ring 6, 7 and end ring 16, 17 or the spacer ring 6, 7 and support disk 3. The form-fit fastener 21 realizes a form-fit connection between the single parts of the pole structure 4, 5, especially the rows of soft iron elements 13 and permanent magnet array 12 and the neighboring elements, such as end ring 16, 17, spacer ring 6, 7, or support disk 3 in a radial direction.

Form-fit element 21 is inserted into the grooves 24, 25 of end ring and spacer ring 24, 25, respectively, or spacer ring and support disk 23 which make it possible to realize a positional fixing of permanent magnet array 12 in a radial direction against soft iron elements 13. Centrifugal force establishes thus a form-fit between individual collector elements and the magnets in radial direction, since the form-fit fastener fixes the position of the magnet array in radial direction and, additionally, the magnet arrays are in peripheral direction joined by form-fit to the collector or soft-iron element 13, or are limited in their displacement travel in radial direction.

FIG. 2 shows a view I—I relative to FIG. 1 on the ring 9. It evidences that the collector or soft-iron elements 13b of ring 9 fix the inner and outer magnets 18b, 19b of the magnet array 12b in radial direction. The collector or soft-iron elements 13b form a first stop 26 disposed radially inside, for the inner magnet 18b, and a stop 27 disposed radially outside, for the outer magnet 19b. Additionally providing the form-fit fastener 21 establishes in interaction with the elements consisting of nonconducting material, such as spacer ring (6,7) and end ring (16,17) as well as spacer ring (6,7) and axial support disk 3, a form-fit in radial direction.

Inventionally significant is that superimposing a radial fixing in radial direction between adjacent magnet arrays and collector or soft-iron elements and a form-fit between the elements adjoining this ring establishes in radial direction a form-fit of the individual magnet arrays and collector or soft-iron elements of an annular arrangement in radial direction, thereby achieving a high stability of the rotor structure. For clamping the individual elements together in axial direction there are provided a number of screw joints small as compared to the prior art, referenced 28 here. They are preferably set on a diameter smaller than the diameter on which the form-fit fasteners 21 are arranged. Screw joints 28 and form-fit fasteners 21 are not physically adjoined one another.

List of References

| | |
|---|---|
| 1 | Rotor |
| 2 | Rotor shaft |
| 3 | Support disk |
| 4, 5 | Pole structure |
| 6, 7 | Spacer ring |
| 8, 9 | Row |
| 10, 11 | Row |
| 12 | Permanent magnet array |
| 13 | Soft-iron element |
| 16, 17 | End ring |
| 18 | Inner magnet |
| 19 | Outer magnet |
| 21 | Fastener |
| 22, 23 | Overhang |
| 24, 25 | Mating groove |
| 26, 27 | Stop |
| 28 | Screw Joint |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotor for an electric machine, said rotor comprising:
at least one support disk having an end face;
at least one annular pole structure arranged on said end face, said annular pole structure coaxial to the rotor axis and extending in axial direction;
a spacer ring of magnetically and electrically nonconducting material;
said pole structure having two adjacent, in peripheral direction, alternately magnetized magnet arrays with interposed collector elements, said rows separated by said spacer ring magnetic arrays include an inner and an outer magnet;
an end ring coordinated with each said pole structure; said end ring, said spacer ring and said support disk having mating grooves adjoining the separate row in peripheral direction of said alternately magnetized magnet arrays with interposed collector elements, said collector elements, said collector elements adjoining said magnet array in peripheral direction designed so that they form a first inside stop and a second outside stop for said magnet array in the radial direction;

protruding elements coordinated with said rows, in a peripheral direction, to said alternately magnetized magnet arrays with interposed collector elements said protruding elements in axial direction protrude on both sides of said array, said protruding elements suited for insertion into said mating grooves;

an intermediate element having said protruding elements located on opposite ends, said intermediate elements composed of nonmagnetic material; and said protruding elements are in radial direction disposed between said inner and said outer magnet and extend in an axial direction beyond said inner and said outer magnet lengths.

2. The rotor according to claim 1 in which said intermediate element is coordinated with each magnet array.

3. The rotor according to claim 2 further comprising:
said support disk having a center;
screw joints in peripheral direction on said support disk at a distance from said center.

4. The rotor according to claim 1 further comprising:
said support disk having a center;
screw joints in peripheral direction on said support disk at a distance from said center.

5. The rotor according to claim 4 wherein said screw joints are disposed within the radial expanse of said inner magnets of the magnet arrays, the magnet arrays in whose region said screw joints are provided being fashioned without inner magnets.

6. The rotor according to claim 1 in which said collector elements are additionally joined by a fastener to the magnet arrays.

7. The rotor according to claim 6 in which said collector elements are additionally joined by composition of matter to the magnet arrays.

8. The rotor according to claim 1 in which said intermediate element extends in peripheral direction at least across part of the expanse of said magnet array.

9. The rotor according to claim 1 in which said intermediate element is fashioned as a plate.

10. The rotor according to claim 1 in which said collector elements are additionally joined by composition of matter to the magnet arrays.

* * * * *